R. & G. A. LANGSTAFF.
ADVERTISING DEVICE.
APPLICATION FILED JUNE 7, 1910.

987,245.

Patented Mar. 21, 1911.

4 SHEETS—SHEET 1.

Witnesses:
C. J. Williams
Ida M. Daskam

Inventors,
Roy Langstaff.
George A. Langstaff.
Seimer G. Wills,
Attorney.

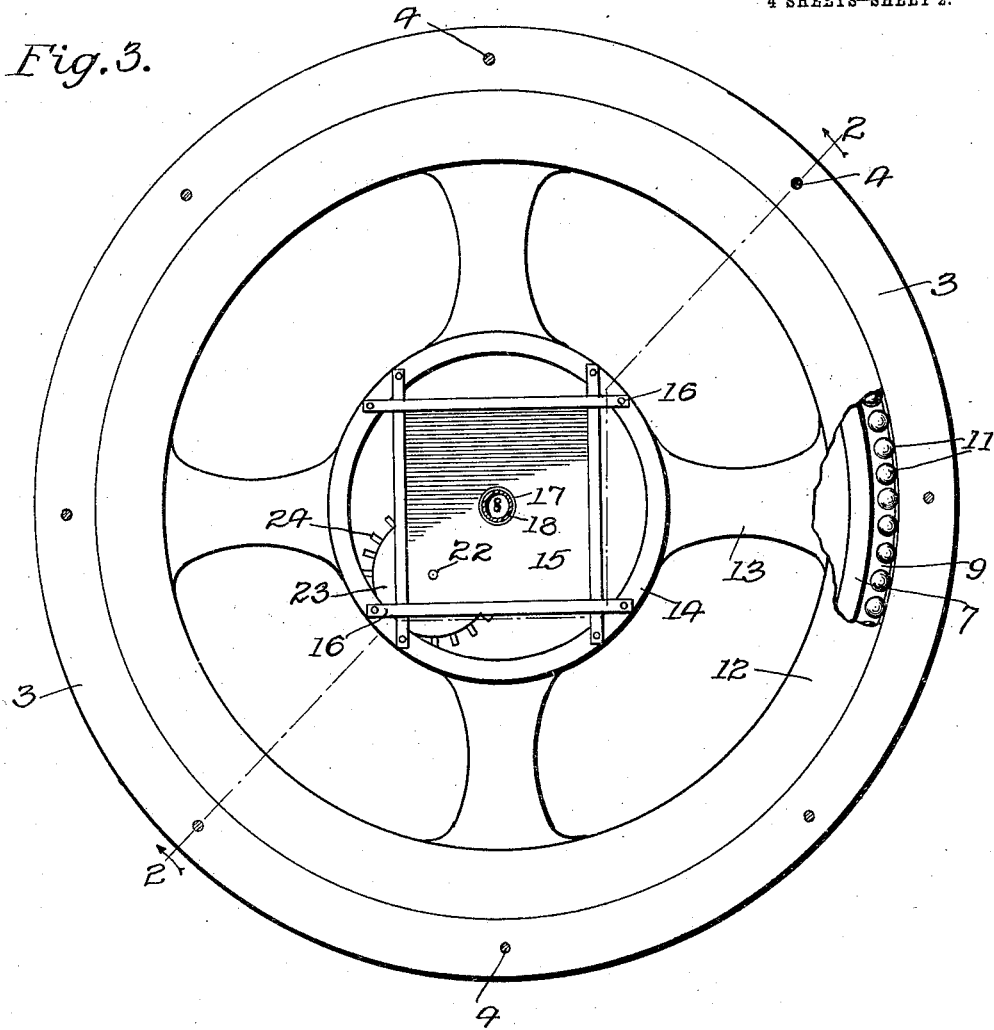
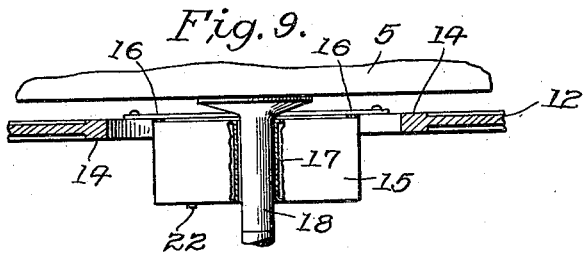

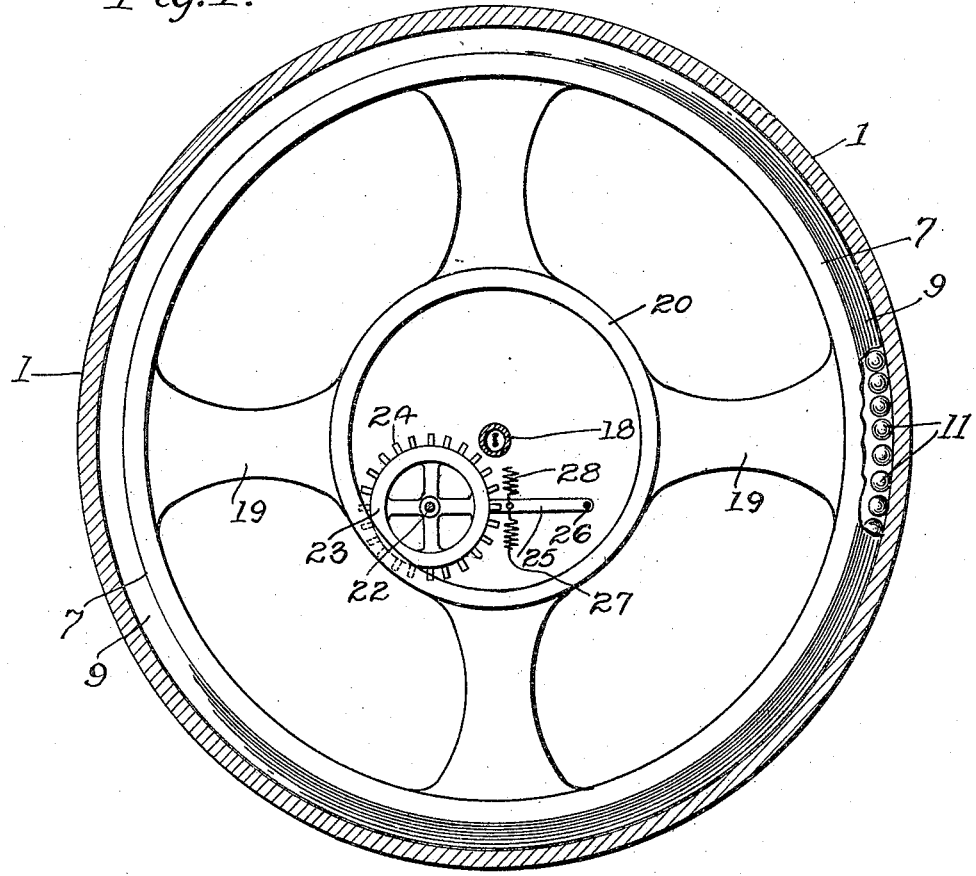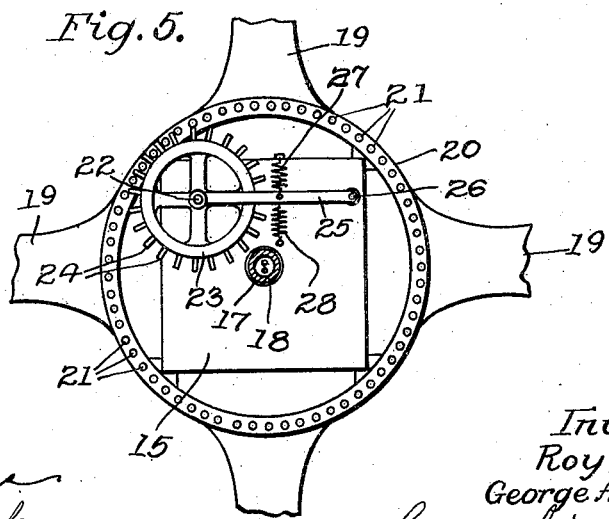

R. & G. A. LANGSTAFF.
ADVERTISING DEVICE.
APPLICATION FILED JUNE 7, 1910.
987,245.
Patented Mar. 21, 1911.
4 SHEETS—SHEET 4.
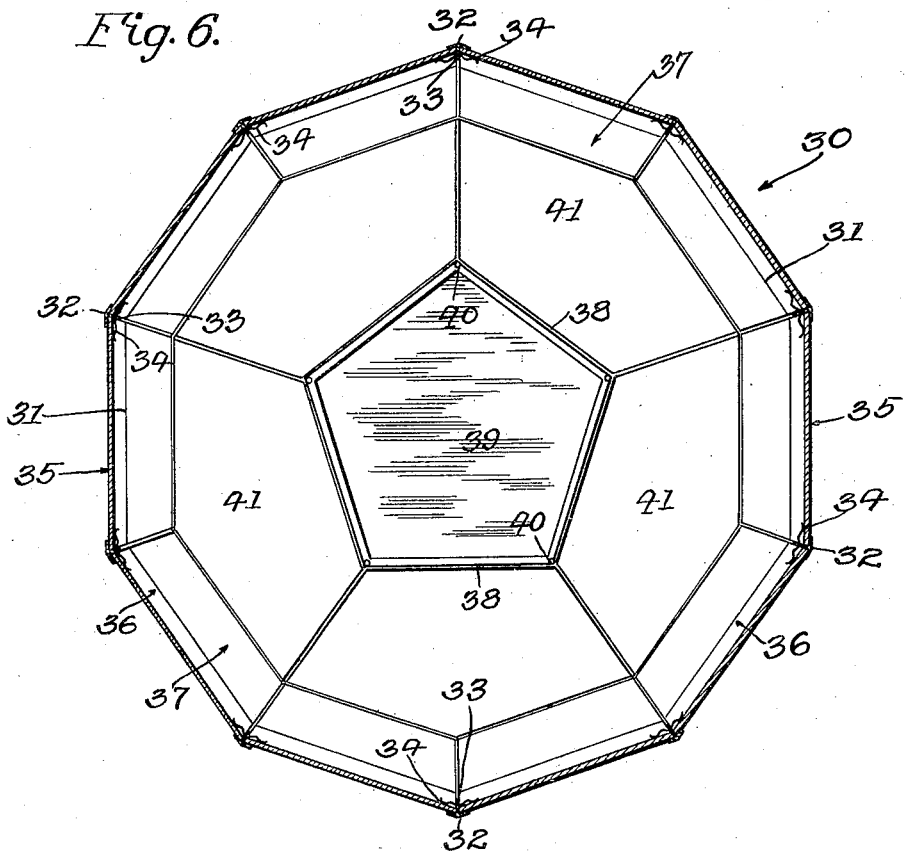
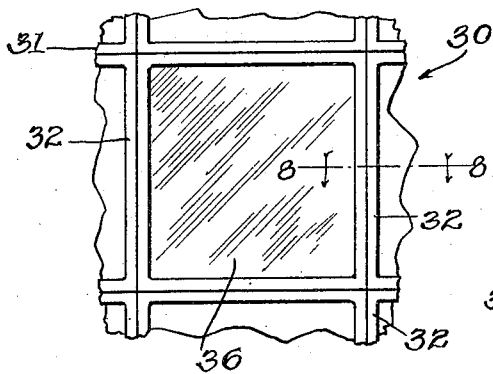
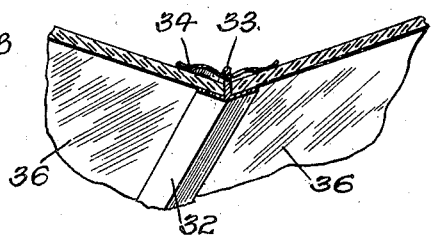
Witnesses:
Inventors,
Roy Langstaff.
George A. Langstaff.
Attorney.

UNITED STATES PATENT OFFICE.

ROY LANGSTAFF, OF LOS ANGELES, AND GEORGE A. LANGSTAFF, OF WHITTIER, CALIFORNIA.

ADVERTISING DEVICE.

987,245.  Specification of Letters Patent.  Patented Mar. 21, 1911.

Application filed June 7, 1910. Serial No. 565,642.

*To all whom it may concern:*

Be it known that we, ROY LANGSTAFF and GEORGE A. LANGSTAFF, citizens of the United States, residing at Los Angeles, California, and Whittier, California, respectively, have invented a new and useful Advertising Device, of which the following is a specification.

Our object is to produce an illuminated advertising device in the form of a light mantle and provide means for rotating the device from a spring motor; and our invention consists of the novel features herein shown, described and claimed.

Figure 1:
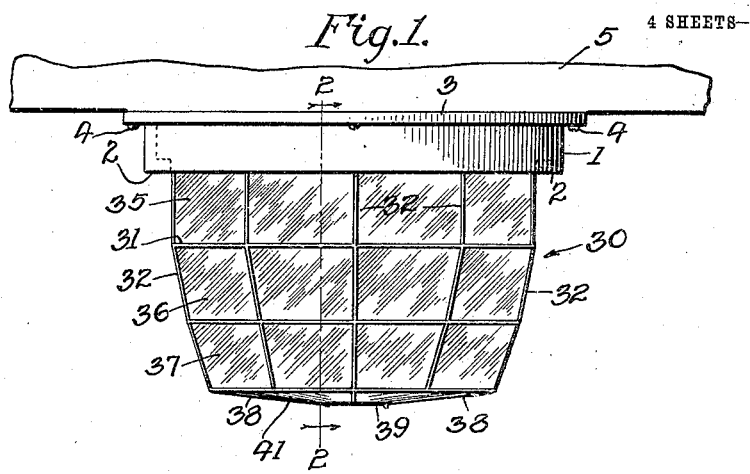
Figure 2:
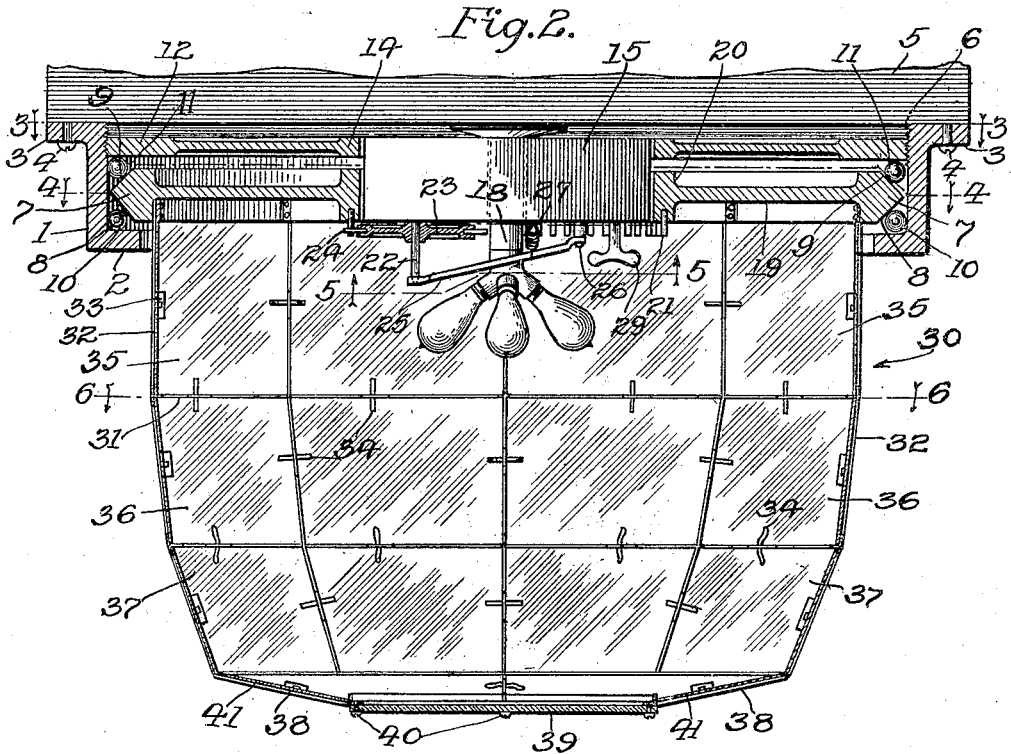

In the drawings: Figure 1 is a view in elevation showing an advertising device embodying the principles of our invention attached to a ceiling or depending from a support. Fig. 2 is a sectional elevation on an enlarged scale and taken on the line 2—2 in Figs. 1 and 3. Fig. 3 is a horizontal section taken on the line 3—3 of Fig. 2. Fig. 4 is a horizontal section on the line 4—4 of Fig. 2 and looking downwardly. Fig. 5 is a fragmentary horizontal section on the line 5—5 of Fig. 2 and looking upwardly. Fig. 6 is a horizontal section on the line 6—6 of Fig. 2 and looking downwardly. Fig. 7 is a fragmentary view in elevation of the framework and glass plates. Fig. 8 is a fragmentary sectional perspective illustrating the mounting of the glass plates. Fig. 9 is a fragmentary sectional detail on a plane parallel with Fig. 2 and showing the lamp fixture extending through the spring motor.

Referring to the drawings in detail, the supporting base comprises a ring 1 having a bearing flange 2 extending inwardly from one edge and an attaching flange 3 extending outwardly from the other edge, so that screws or nails 4 may be inserted through the attaching flange and into the ceiling or support 5. The attaching flange 3 may be a continuous ring as shown, or it may be simply gears or other suitable means. A screw thread 6 is formed in the ring 1 at the opposite side from the bearing flange 2. A bearing ring 7 has beveled outer faces 8 and 9, said faces being substantially at angles of 45° relative to the inner face of the ring 1. A series of bearing balls 10 is placed upon the bearing flange 2 and the ring 7 inserted downwardly into the ring 1 with the face 8 bearing against the balls 10 as in an ordinary ball race, and a series of balls 11 is placed against the beveled face 9 and against the inner face of the ring 1, and then the bearing adjusting ring 12 having threads matching the threads 6 is screwed downwardly against the balls 11, thereby mounting the ring 7 rotatably in the base.

Arms 13 extend radially inwardly from the adjusting ring 12 and a ring 14 is formed at the inner ends of the arms 13 concentric with the ring 12. The spring motor 15 is inserted downwardly into the ring 14 and the framework 16 of the spring motor rests upon the upper edge of the ring 14 and is rigidly secured thereto. A tube 17 is inserted through the spring motor 15 at its axial center, and an electric light fixture 18 is secured to the ceiling 5 and extends downwardly through the tube 17. Arms 19 extend radially inwardly from the ring 7 and a ring 20 is formed integral with the inner ends of the arms 19 concentric with the ring 7, and in alinement with the ring 14, said ring 20 surrounding the spring motor 15.

Gear rack pins 21 extend downwardly from the ring 20, the driving shaft 22 extends downwardly from the spring motor works, the driving wheel 23 is fixed upon the driving shaft 22 and has pin teeth 24 meshing with the pin teeth 21, so that as the spring motor operates, said spring motor being held stationary, the ring 7 will be rotated in the ball bearings. A bearing bar 25 is connected to the frame of the spring motor by a pivot 26 and the lower end of the shaft 22 operates in a bearing in the swinging end of the bearing bar 25, and springs 27 and 28 connect the swinging end of the bar 25 to the frame, the tension of the springs being adjusted to hold the bar 25 in its normal position and allow vibration of the lower end of the shaft 22 as required to prevent rattling and binding of the pins 24 upon the pins 21. A winding stem 29 of the spring motor projects downwardly at one side of the electric light fixture. The mantle 30 is secured to the ring 7 and comprises a metallic framework filled with glass or celluloid plates, said plates being removable so that advertising matter may be printed or painted upon the plates and inserted into place for a desired length of time and then the plates removed and other plates containing other matter inserted. The mantle frame comprises horizontal bars 31 and vertical bars 32 so located as to receive plates of the desired size and shape, the upper ends of the bars 32 being attached to the inner face of the lower part of the ring 7. Ears 33 extend inwardly from the bars 31 and 32 between the plates, and spring keys 34 are inserted through the ears inside of the plates. The plates 35 forming the upper row are substantially rectangular or square, while the plates 36 and 37 forming the two lower rows are slightly tapered. From the lower edges of the plates 37 alternate ones of the bars 32 are omitted and the remaining ones of the bars 32 are brought nearly to horizontal positions, and bars 38 connect the extreme lower ends of the bars 32 to form a five pointed opening, and a plate 39 is removably inserted into this opening and held in position by screws 40 and plates 41 are inserted into the five spaces surrounding the plate 39 and held in place by the spring keys 34, so that by removing the screws 40 the plate 39 may be removed and then the other plates may be manipulated from the inside of the mantle frame, and so that the spring motor may be wound and the electric lights manipulated.

It is obvious that the advertising device thus constructed may be mounted upon a floor or depend from the ceiling, or project out from the wall, or mounted in any other desirable position, and that the details of construction may be varied in numerous ways without departing from the spirit of our invention.

We claim:

1. An advertising device comprising a base ring having a bearing flange extending inwardly from one edge, and attaching means extending outwardly from the other edge and having an internal screw thread opposite the bearing flange, bearing balls against the bearing flange, a bearing ring against the bearing balls, said bearing ring having two inclined faces, one of said faces being in opposition to the bearing flange, bearing balls against the other face of the bearing ring, an adjusting ring screwed into the base ring against the last mentioned bearing balls, a mantle carried by the bearing ring so as to be rotatively mounted, a spring motor carried by the adjusting ring and a connection between the spring motor and the bearing ring whereby the mantle is rotated by the operation of the spring motor.

2. An advertising device comprising a base ring having a bearing flange extending inwardly from one edge, and attaching means extending outwardly from the other edge and having an internal screw thread opposite the bearing flange, bearing balls against the bearing flange, a bearing ring against the bearing balls, said bearing ring having two inclined faces, one of said faces being in opposition to the bearing flange, bearing balls against the other face of the bearing ring, an adjusting ring screwed into the base ring against the last mentioned bearing balls, a mantle carried by the bearing ring so as to be rotatively mounted, a spring motor carried by the adjusting ring and a connection between the spring motor and the bearing ring whereby the mantle is rotated by the operation of the spring motor, and means mounted inside of the mantle for illumination.

ROY LANGSTAFF.
GEORGE A. LANGSTAFF.

Witnesses:
E. B. MORTON,
IDA M. DASKAM.

---

Copies of this patent may be obtained for five cents each, by addressing the "Commissioner of Patents Washington, D. C."